United States Patent
Kunitake et al.

[11] Patent Number: 5,900,946
[45] Date of Patent: * May 4, 1999

[54] IMAGE INFORMATION ENCODING/ DECODING APPARATUS ASSURING A MINIMUM COMPRESSION RATIO AND LIMITING A TRANSFER RATE

[75] Inventors: Setsu Kunitake; Koh Kamizawa; Yutaka Koshi; Shunichi Kimura; Akihiro Andoh, all of Kanagawa, Japan

[73] Assignee: Fuji Xerox Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/416,984

[22] Filed: Apr. 5, 1995

[30] Foreign Application Priority Data

Sep. 9, 1994 [JP] Japan .................... 6-216407

[51] Int. Cl.$^6$ ................................. H04N 1/41
[52] U.S. Cl. ................... 358/426; 358/405; 348/419
[58] Field of Search ................... 358/426, 405, 358/404, 406, 412, 261.2, 468, 442; 382/238, 251, 246, 239, 250; 348/390, 395, 405, 384, 407, 419, 438, 437; 370/421

[56] References Cited

U.S. PATENT DOCUMENTS

| | | | |
|---|---|---|---|
| 4,823,201 | 4/1989 | Simon et al. ............... | 348/399 |
| 5,005,076 | 4/1991 | Stroppina et al. ........... | 358/135 |
| 5,111,294 | 5/1992 | Asai et al. ................ | 358/136 |
| 5,142,667 | 8/1992 | Dimperio et al. ........... | 395/115 |
| 5,247,357 | 9/1993 | Israelsen .................. | 358/133 |

(List continued on next page.)

FOREIGN PATENT DOCUMENTS

| | | |
|---|---|---|
| 0 473 374 A2 | 3/1992 | European Pat. Off. . |
| 04307887 | 10/1992 | Japan . |
| 06022152 | 1/1994 | Japan . |

OTHER PUBLICATIONS

Pulse Modulation Systems, pp. 456–459. (month & year are not available).
Unknown Chinese language document bearing the mark 150602. (month/year are not available).
Translation of Rejection Notification–Taiwanese Office Action. (month/year are not available).
European Search Report for Application No. EP 95 10 5854, Oct. 20, 1997.
"International Standards of Multimedia Coding" H. Yasuda, Maruzen Co., Ltd. pp. 14–47, published Jun. 30, 1991.
"Bit–rate Control Method for DCT Image Coding", 1989 Autumn National Convention Record, The Institute of Electronics, Information and Communication Engineers, D–45, pp. 6–45.

*Primary Examiner*—Edward L. Coles
*Assistant Examiner*—Madeleine AV Nguyen
*Attorney, Agent, or Firm*—Finnegan, Henderson, Farabow, Garrett & Dunner, L.L.P.

[57] ABSTRACT

Transfer control information for controlling a transfer amount per unit time of a transfer path is delivered from a transfer control section to an information transfer section. During encoding, the information transfer section receives image information from an external device in accordance with the transfer control information, and inputs the same to an image-information encoding/decoding section. A code-amount control section forwards code-amount control information for controlling the code amount to the image-information encoding/decoding section. The image-information encoding/decoding section encodes the image information in accordance with the code-amount control information outputted from the code-amount control section. The information transfer section transfers to an external device encoded information outputted from the image-information encoding/decoding section, while the transfer amount per unit time is being controlled by the transfer control section.

1 Claim, 5 Drawing Sheets

U.S. PATENT DOCUMENTS

| | | | |
|---|---|---|---|
| 5,323,187 | 6/1994 | Park | 348/405 |
| 5,335,016 | 8/1994 | Nakagawa | 348/405 |
| 5,367,629 | 11/1994 | Chu et al. | 395/162 |
| 5,384,644 | 1/1995 | Yamagami | 358/426 |
| 5,386,233 | 1/1995 | Keith | 348/407 |
| 5,430,556 | 7/1995 | Ito | 382/246 |
| 5,473,704 | 12/1995 | Abe | 358/433 |
| 5,541,852 | 7/1996 | Eyuboglu et al. | 364/514 |
| 5,588,075 | 12/1996 | Chiba et al. | 382/246 |
| 5,623,557 | 4/1997 | Shimoyoshi et al. | 382/246 |
| 5,689,307 | 11/1997 | Sugahara et al. | 348/419 |

IMAGE INFORMATION ENCODING/ DECODING APPARATUS ASSURING A MINIMUM COMPRESSION RATIO AND LIMITING A TRANSFER RATE

BACKGROUND OF THE INVENTION

The present invention relates to an image-information encoding processing apparatus and an image-information decoding processing apparatus for processing the encoding or decoding of digital still-image information, and an image-information encoding/decoding processing apparatus for performing the processing of encoding and decoding.

It is now a common procedure that a large volume of digital image information is transmitted and stored after being encoded. As techniques for encoding image information in this case, various methods have been developed and are selectively used. Depending on the encoding techniques, there are cases where the image information is not compressed to a remarkable degree even if encoding is performed, or cases where although highly efficient compression is possible, the image quality deteriorates when the encoded image information is decoded. For this reason, a targeted compression ratio is set, and an encoding technique to be used is selected.

The targeted compression ratio and the encoding technique are generally determined by taking into consideration the image quality of a reproduced image, processing time, a transfer rate, a storage capacity and the like and in accordance with their priorities. As for the targeted compression ratio, if, for example, the image quality of the reproduced image is given priority, encoding is effected by setting the compression at a low level so as to reduce the deterioration of the reproduced image. On the other hand, if it is required to transmit the image information within a limited time on a limited transmission route, or to store it in a storage device of a limited capacity within a limited time, it is absolutely essential to encode any image at a high compression ratio.

The encoding techniques include fixed-length coding in which the code amount is unfailingly fixed and variable-length coding in which the code amount varies depending on the image. If the fixed-length coding is used, the storage capacity can be easily determined, so that it is convenient when structuring a system. In the fixed-length coding, however, the encoding efficiency is often inferior as compared with the variable-length coding in which encoding is carried out by reflecting image characteristics. By taking advantages and disadvantages of such encoding techniques into account, it is necessary to select an encoding technique to be used. In the case of digital color images, for instance, since the amount of information is very large, the variable-length coding is used in many cases.

The variable-length coding system is adopted also in, for example, a Joint Photographic Coding Experts Group (JPEG) system which is an international standard of a still-image encoding system. At present, encoding/decoding apparatuses of the JPEG system are easily available, so that information on encoding in a format based on the JPEG system is widely utilized through networks.

FIG. 5 is a block diagram illustrating a configuration of an encoding apparatus of the JPEG system. In the drawing, reference numeral 51 denotes an input image; 52, a blocking section; 53, blocked-image information; 54, a discrete cosine transform (DCT) section; 55, transform coefficients; 56, a quantizing section; 57, a quantized transform coefficient; 58, an entropy coding section; and 59, encoded information. The input image 51 is segmented into pieces of blocked-image information 53 each consisting of N×N pixels by the blocking section 52, and is inputted to the DCT section 54. In the DCT section 54, the blocked-image information 53 is subjected to DCT, and the transform coefficients 55 are inputted to the quantizing section 56. The transform coefficients 55 are quantized by the quantizing section 56. The quantized transform coefficients 57 are coded by the entropy coding section 58, and the encoded information 59 is outputted.

As problems of the variable-length coding, it can be pointed out that, since the characteristics of the input image are reflected on the encoding efficiency, the code amount does not become fixed, and that a high compression ratio is not achieved depending on the input image or a coding parameter. Therefore, in cases where a high compression ratio is always required when, for instance, priorities are placed on such elements as the processing time, the transfer rate, and the storage capacity, a control method called code-amount control for controlling the compression ratio is used in the variable-length coding.

The code-amount controlling techniques include, for instance, "Bit-rate Control Method for DCT Image Coding," 1989 Autumn National Convention Record, The Institute of Electronics, Information and Communication Engineers, D-45, pp. 6-45. The method described in this document is a bit-rate control method with respect to an encoder using an algorithm similar to that employed in the JPEG system.

FIG. 6 is a block diagram illustrating an example of an encoder using a conventional code-amount controlling technique. In the drawing, those portions that are similar to those of FIG. 5 are denoted by the same reference numerals, and a description thereof will be omitted. Reference numeral 60 denotes a memory section; 61, a code amount; 62, a quantizing-step measuring/estimating section; 63, a quantizing step value; and 64, a variable-length coding (VLC) section. The input image 51 is segmented into pieces of blocked-image information 53 each consisting of N×N pixels by the blocking section 52, and is subjected to transformation by the DCT section 54, and the transform coefficients 55 are stored in the memory section 60. In the quantizing section 56, the transform coefficients 55 are read from the memory section 60, and are quantized, and the quantized transform coefficients 57 are coded by the VLC section 64. The code amount 61 at this time is inputted to the quantizing-step measuring/estimating section 62. This coding operation is carried out by using a plurality of different quantizing step values. Here, the quantizing step is one of coding parameters in this coding system, and is used when the quantizing section 56 effects quantization.

In the quantizing-step measuring/estimating section 62, a quantizing step value for achieving a targeted code amount is estimated on the basis of the code amounts 61 obtained by the plurality of coding operations. Then, the estimated quantizing step value 63 is set in the quantizing section 56, and encoding is carried out again. In addition, if the above-described operation is further repeated, high accurate estimation becomes possible.

FIG. 7 is a block diagram illustrating another example of an encoder using a conventional code-amount controlling technique. The reference numerals in the drawing are similar to those of FIG. 6. If a storage device for storing image information is used outside the encoder, it is possible to adopt a configuration in which the memory section 60 in FIG. 6 is not provided, as shown in FIG. 7. In the configuration shown in FIG. 7, encoding is carried out a plurality of times by reading the image information from the storage device a necessary number of times and by inputting the same to the encoder, and a quantizing step is estimated in the quantizing-step measuring/estimating section 62. Then, coding is carried out by setting the estimated quantizing step value 63 in the quantizing section 56, thereby effecting an encoding such that the code amount becomes a targeted code amount or less.

FIG. 8 is a diagram illustrating an example of a system configuration including an apparatus for inputting and outputting an image. In the drawing, reference numeral 71 denotes an input device; 72; an output device; 73, a high-speed storage device; and 74, a data bus. In a case where the input device 71 such as a scanner and the output device 72 such as a printer are continuously operated at high speed, the input device 71, the output device 72, and the high-speed storage device 73 such as memory are connected to the data bus 74, and information which is continuously inputted from the input device 71 is stored in the high-speed storage device 73, while information stored in the high-speed storage device 73 is read out, and is continuously outputted to the output device 72. However, the high-speed storage device 73 such as the memory is generally expensive as compared with a storage device such as a hard disk (a large-capacity storage device), so tat the provision of the high-speed storage device 73 for a number of pages presents a problem in terms of cost. Meanwhile, the large-capacity storage device such as a hard disk is slow in the processing speed in reading and writing. For this reason, in the configuration shown in FIG. 8, the large-capacity storage device cannot be applied as it is in place of the high-speed storage device 73.

FIG. 9 is a diagram illustrating another example of the system configuration including a device for inputting and outputting an image. In the drawing, those portions that are similar to those of FIG. 8 will be denoted by the same reference numerals, and a description thereof will be omitted. Reference numeral 75 denotes an encoding/decoding processing apparatus, and 76 denotes a large-capacity storage device. To solve the problem of the configuration shown in FIG. 8, a method is conceivable in which the encoding/decoding processing apparatus 75 is introduced as shown in FIG. 9, and encoded information is stored in the large-capacity storage device 76.

In the system shown in FIG. 9, when information is inputted, the information inputted from the input device 71 is stored in the high-speed storage device 73, and coding is effected in the encoding/decoding processing apparatus 75, is stored in the high-speed storage device 73, and is outputted by the output device 72. Thus, in the system shown in FIG. 9, the amount of information stored in the large-capacity storage device 73 is reduced by the encoding/decoding processing apparatus 75, and the processing time required for reading and writing is shortened.

It is difficult for the input and output devices to be interrupted at an accurate point during continuous high-speed operation. For this reason, if an attempt is made to interrupt the operation midway, there is a possibility of the data being inputted or outputted becoming lost. In addition, the interruption of the operation can possibly lead to an appreciable decline in efficiency because of the mechanical restrictions of the input and output devices. For such reasons, in order to actually allow the input device 71 and the output device 72 to be continuously operated at high speed in the configuration shown in FIG. 9, it is necessary that a minimum compression ratio be ensured irrespective of the input image. This makes it possible to minimize the time of transfer between the large-capacity storage device 76 and the encoding/decoding processing apparatus 75, and secure the transfer time of the input and output devices. Additionally, it is also necessary to ensure the data transfer time necessary for transferring on the common data bus 74 sufficient data for allowing the input and output devices, such as the input device 71 and the output device 72, to be operated continuously.

In order to ensure a minimum compression ratio irrespective of the input image, the scheme can be realized by adopting the variable-length coding system using the code-amount controlling technique shown in FIG. 6 or 7. To ensure a sufficient data transfer time for the input device 71 and the output device 72, one method is conceivable in which a transfer management device is provided to restrict the time the bus is used by the respective devices on the bus. This method, however, is not advantageous since it requires a means for updating a management method each time the system configuration of the devices is changed.

SUMMARY OF THE INVENTION

The present invention has been devised in view of the above-described circumstances, and its object is to provide an image information encoding/decoding processing apparatus which can coexist with other devices by ensuring a minimum compression ratio and restricting the transfer amount per unit time.

According to a first aspect of the invention, an image-information encoding apparatus comprises:

image-information encoding means for encoding input image information, to produce encoded information;

information transfer means for transferring the encoded information to an external device;

transfer controlling means for controlling said information transfer means so that a transfer rate of said information transfer means is not larger than a specified value; and code-amount controlling means for controlling an amount of the encoded information produced by said image-information encoding means based on the transfer rate controlled by said transfer controlling means.

According to a second aspect of the invention, an image-information decoding apparatus comprises:

image-information decoding means for decoding coded information of input image information, to produce image information;

information transfer means for transferring, to an external device, the image information produced by the image-information decoding means;

transfer controlling means for controlling said information transfer means so that a transfer rate of said information transfer means is not larger than a specified value; and decoding controlling means for controlling an amount of the image information produced by said image-information decoding means based on the transfer rate controlled by said transfer controlling means.

According to a third aspect of the invention, an image-information encoding and decoding processing apparatus comprises:

image-information encoding means for encoding input image information, to produce encoded information;

image-information decoding means for decoding coded information of input image information, to produce image information;

information transfer means for transferring, to an external device, the encoded information produced by the image-information encoding means or the image information produced by the image-information decoding means;

transfer controlling means for controlling said information transfer means so that a transfer rate of said information transfer means is not larger than a specified value;

code-amount controlling means for controlling an amount of the encoded information produced by said image-information encoding means based on the transfer rate controlled by said transfer controlling means; and decoding controlling means for controlling an amount of the image information produced by said image-information decoding means based on the transfer rate controlled by said transfer controlling means.

With the above constitution, controlled by the code amount controlling means or the decoding controlling means, the image-information encoding means or the image-information decoding means can always produce encoded information or image information of the predetermined amount that is not larger than the predetermined amount. Further, the information transfer control means is controlled by the transfer controlling means, so that the transfer rate of the information transfer means can be made not larger than the predetermined value. Further, the transfer rate is transmitted from the transfer controlling means to the code-amount controlling means or the decoding controlling means, and the code-amount controlling means or the decoding controlling means controls the image-information encoding means or the image-information decoding means based on the received transfer rate. As a result, encoding or decoding processing can be performed based on the transfer rate, whereby the processing efficiency of the overall system can be improved.

The image-information encoding apparatus or the image-information encoding and decoding apparatus may be constructed such that said image-information encoding means comprises blocking means for dividing the input image information into blocks each consisting of a predetermined number of pixels, discrete cosine transform means for subjecting the block-divided image information to discrete cosine transform, to produce transform coefficients, quantizing means for quantizing the transform coefficients, and variable-length coding means for subjecting the quantized transform coefficients to variable-length coding; and that said code-amount controlling means estimates a quantizing step value based on results of encoding identical input image information with different quantizing step values a plurality of times so as to ensure that the amount of the encoded information produced by said image-information encoding means is not larger than a specified value, and controls said image-information encoding means by using the estimated quantizing step value.

With the above constitution employing the JPEG type encoding scheme, it becomes possible to realize encoding processing which ensures a minimum compression ratio.

The image-information encoding apparatus or the image-information encoding and decoding apparatus may constructed such that said image-information encoding means comprises blocking means for dividing the input image information into blocks each consisting of a predetermined number of pixels, discrete cosine transform means for subjecting the block-divided image information to discrete cosine transform, to produce transform coefficients, quantizing means for quantizing the transform coefficients, and variable-length coding means for subjecting the quantized transform coefficients to variable-length coding; and that said code-amount controlling means stops encoding of said image-information encoding means at a time point when an amount of encoded information of each block has become not larger than a specified value.

With above constitution employing the JPEG type encoding scheme, the amount of encoded information can be made not larger than the specified value irrespective of the image, and high-speed encoding processing can be realized.

The image-information encoding apparatus, the image-information decoding apparatus, or the image-information encoding and decoding apparatus may be constructed such that said information transfer means supplies a transfer request to an external transfer control device when prepared for transfer, and transfers to the external device the encoded information produced by said image-information encoding means or the image information produced by the image-information decoding means after receiving a transfer permission from the external transfer control device; and that said transfer controlling means controls said information transfer means so that said information transfer means outputs the transfer request at an interval not shorter than a predetermined interval.

With the above constitution, since the transfer is effected at intervals not shorter than the preset interval, a sufficient transfer time can be secured for other devices, to allow those devices to operate efficiently.

DESCRIPTION OF THE PREFERRED EMBODIMENT

Figure 1:
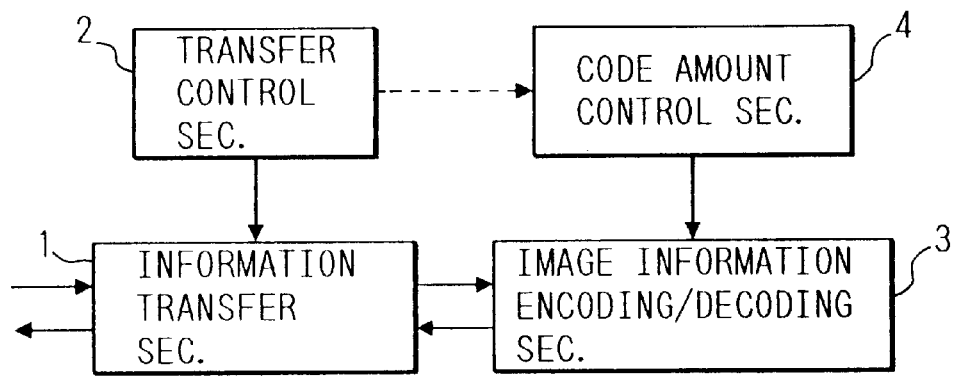
FIG. 1 is a block diagram illustrating an embodiment of an image-information encoding/decoding processing apparatus in accordance with the present invention.

FIG. 1 is a block diagram illustrating an embodiment of an image-information encoding/decoding processing apparatus in accordance with the present invention. In the drawing, reference numeral 1 denotes an information transfer section; 2, a transfer control section; 3, an image-information encoding/decoding section; and 4, a code-amount control section.

The information transfer section 1 transfers image information or encoded information to an external device via a transmission path such as a data bus or a network. The transfer control section 2 controls the rate of transfer per unit time on the transmission path when transfer is effected by the information transfer section 1. The image-information encoding/decoding section 3 encodes or decodes the image information. The code-amount control section 4 controls the amount of coded or decoded information to a designated value or less when encoding or decoding is effected by the image-information encoding/decoding section 3. As this designated value, it is possible to adopt a value based on the transfer rate which is controlled by the transfer control section 2.

A description will be given of an example of the operation in accordance with the embodiment of the image-information encoding/decoding processing apparatus in the present invention. First, a description will be given of an example of the operation during encoding. Transfer control information for controlling the rate of transfer per unit time on the transmission path is delivered to the information transfer section 1 from the transfer control section 2. The information transfer section 1 receives image information from an external device in accordance with the transfer control information delivered to the information transfer section 1, and inputs the same to the image-information encoding/decoding section 3. The code-amount control section 4 delivers to the image-information encoding/decoding section 3 code-amount control information for controlling the code amount. The image-information encoding/decoding section 3 encodes the image information in accordance with the code-amount control information outputted thereto from the code-amount control section 4. The information transfer section 1 transfers the encoded information outputted thereto from the image-information encoding/decoding section 3 to an external device while the rate of transfer per unit time is being controlled by the transfer control section 2, in the same way as the information transfer section 1 receives the image information.

Next, a description will be given of an example of the operation during decoding. In the same way as during encoding, transfer control information for controlling the rate of transfer per unit time on the transmission path is delivered from the transfer control section 2 to the information transfer section 1. The information transfer section 1 receives encoded information from the external device in accordance with the transfer control information delivered thereto, and inputs the same to the image-information encoding/decoding section 3. The image-information encoding/decoding section 3 decodes the encoded information in accordance with the code-amount control information from the code-amount control section 4, and outputs the same, in the same way as during encoding. The information transfer section 1 transfers the decoded image information to the external device while the rate of transfer per unit time is being controlled by the transfer control section 2.

For instance, when encoded data stored in a storage means such as a disk is decoded by the image-information encoding/decoding section 3, and is temporarily stored in a high-speed storage means such as a page memory, and then the image data stored in the high-speed storage means is outputted from an image input/output means such as a printer, the transfer control section 2 assigns, to the information transfer section 1, the remaining frequency band for use excluding a band necessary for the data bus to transfer the image data from the high-speed storage means to the image input/output means. At the same time, the transfer control section 2 transmits to the code-amount control section 4 information on the remaining band excluding the band necessary for the data bus to transfer the image data from the high-speed storage means to the image input/output means. The code-amount control section 4 decodes the encoded data stored in the storage means by means of the image-information encoding/decoding section 3, stores the same in the high-speed storage means, and calculates an encoding ratio for the image-information encoding/decoding section 3 necessary for uninterruptedly outputting the image data stored in the high-speed storage means from the image input/output means.

Even in the case where the encoded data in the storage means is transferred via the data bus using the remaining band excluding the band used necessary for the data bus to transfer the image data from the high-speed storage means to the image input/output means, decoded by the image-information encoding/decoding section 3, and then stored in the high-speed storage means, the image data stored in the high-speed storage means can be outputted uninterruptedly from the image input/output means if the encoding ratio calculated by the code-amount control section 4 is used. That is, this arrangement ensures that the decoded image data on an ensuing page is stored in the high-speed storage means until the outputting of image data on one page is completed. The image-information encoding/decoding section 3 encodes the image data at the encoding ratio calculated by the code-amount control section 4.

Thus, in the transfer of data to an external device, the rate of transfer per unit time is controlled by the transfer control section 2, and the amount of data itself which is transferred is also controlled by the code-amount control section 4. For this reason, the transfer time this image-information encoding/decoding processing apparatus occupies the transmission path can be controlled in correspondence with the transfer time required by other devices connected to the transmission path such as the data bus and the network. In addition, it becomes possible to effect encoding or decoding processing in accordance with the processing time and the transfer rate at which the data can be transferred during such a transfer time.

Figure 5:
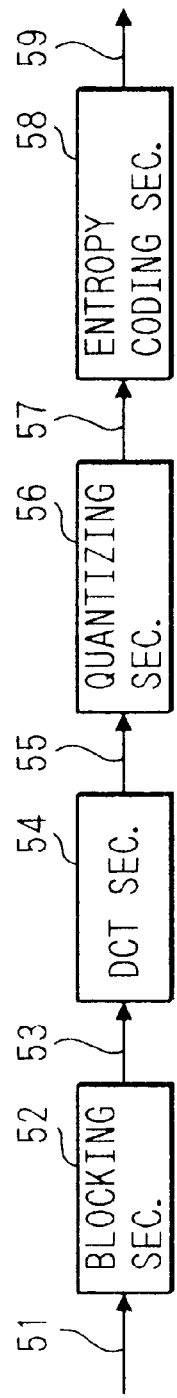
FIG. 5 is a block diagram illustrating a configuration of an encoder of the JPEG system.
Figure 6:
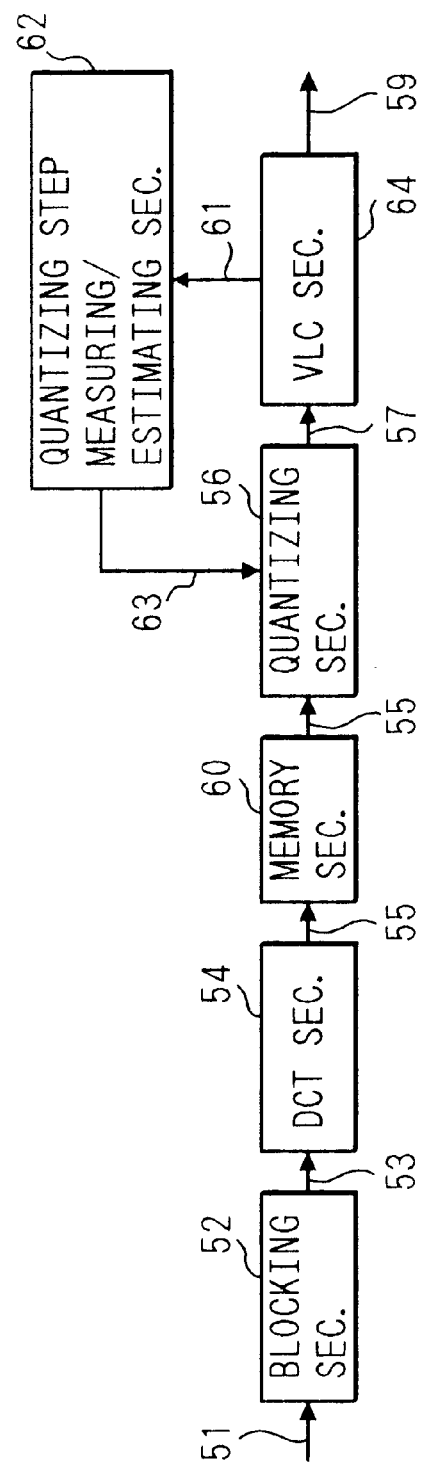
FIG. 6 is a block diagram illustrating an example of an encoder using a conventional code-amount control method.
Figure 7:
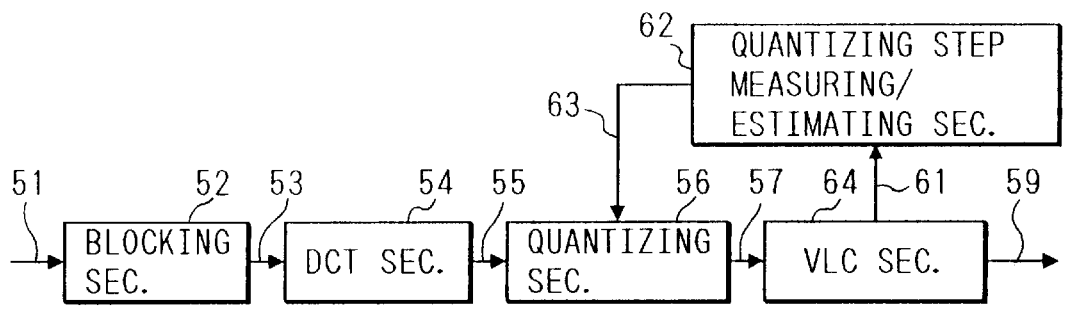
FIG. 7 is a block diagram illustrating another example of the encoder using the conventional code-amount control method.
Figure 8:
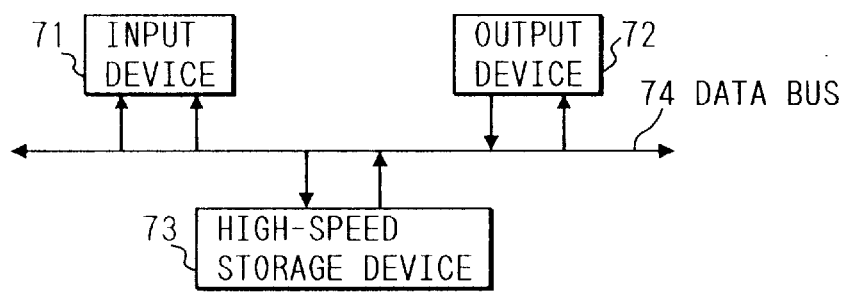
FIG. 8 is a diagram illustrating an example of a system configuration including devices for inputting and outputting an image.

The JPEG system such as the one shown FIG. 5 can be used as the portion for effecting encoding in the image-information encoding/decoding section 3. At this time, it is possible to adopt a configuration shown in FIG. 6, together with the code-amount control section 4. In such a configuration, a quantizing-step measuring/estimating section 62 corresponds to the code-amount control section 4. The code-amount control section 4 performs quantization a plurality of times while changing the quantizing step value, and determines a quantizing step value at which the code amount becomes a set value or less. By using the determined quantizing step value, encoded information is obtained by performing quantization and variable-length encoding processing, and is outputted from the image-information encoding/decoding section 3. An arrangement may be provided such that, if the code amount has reached a set value or less during the plurality times of quantizing processing, the processing by the code-amount control section 4 is stopped at that point of time, and the code at the time when the code amount has reached the set value or less is provided as an output of the image-information encoding/decoding section 3. Incidentally, the portion for effecting decoding is configured in such a way as to effect decoding processing corresponding to the encoding-system.

Figure 9:
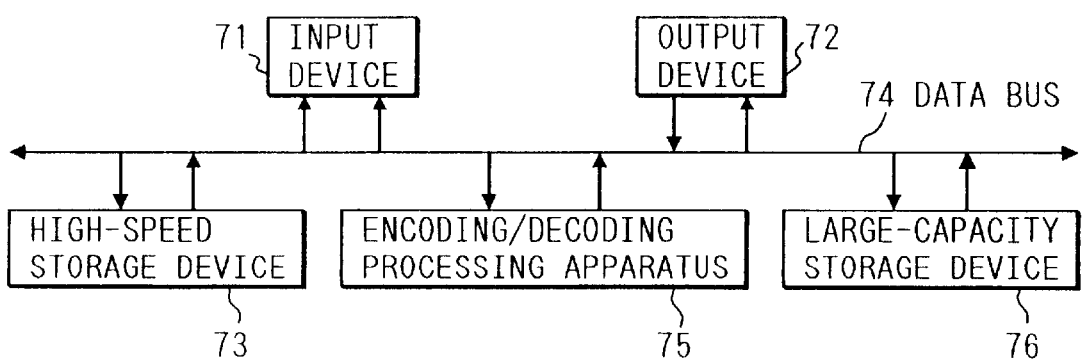
FIG. 9 is a diagram illustrating another example of the system configuration including the devices for inputting and outputting an image.

In addition, the above-described image-information encoding/decoding processing apparatus can be used in a system to which a still-image input/output apparatus and a storage device are connected, as shown in FIG. 9. In this case, a minimum compression ratio is ensured by the code-amount control section 4, and the processing time for reading and writing by the storage device such as a hard disk can be held down to a time which does not present a problem in the continuous operation of the system. In addition, as the rate of transfer per unit time is controlled by the transfer control section 2, it is possible to secure the transfer rate on the bus, which is required for allowing the input/output device to operate at high speed, thereby permitting the continuous operation of the system.

The image-information encoding/decoding section 3 may be configured by either the encoder or the decoder, in which case it is possible to obtain an image-information encoding processing apparatus and an image-information decoding processing apparatus.

If this image-information encoding/decoding processing apparatus is connected to a data bus, a direct memory access controller (DMAC), for instance, can be used as the information transfer section 1. In a case where data is read from a destination of transfer, the DMAC issues a transfer request to the destination of transfer when preparations for accepting the data are made, such as the securing a memory area, and the DMAC effects the transfer of the data. In addition, in a case where data is written in the destination of transfer, when the data to be transferred has been gathered, the DMAC issues a transfer request to the destination of transfer, and transfers the data. If, as shown in FIG. 9, other devices are also connected to the data bus, and the data bus is shared to effect the transfer by using the data bus, the transfer request is issued to the bus as a bus request.

A bus control device for managing the transfer on the bus is generally located on the data bus. If a bus request is issued from a device connected to the bus, the state of the bus is detected, and if there is no device which is using the bus, a permission for using the bus is given, and transfer is executed. If bus requests have been issued by a plurality of devices, the permission for using the bus is given in order at the discretion of the bus control device, so as to prevent the collision of data on the bus.

Figure 2:
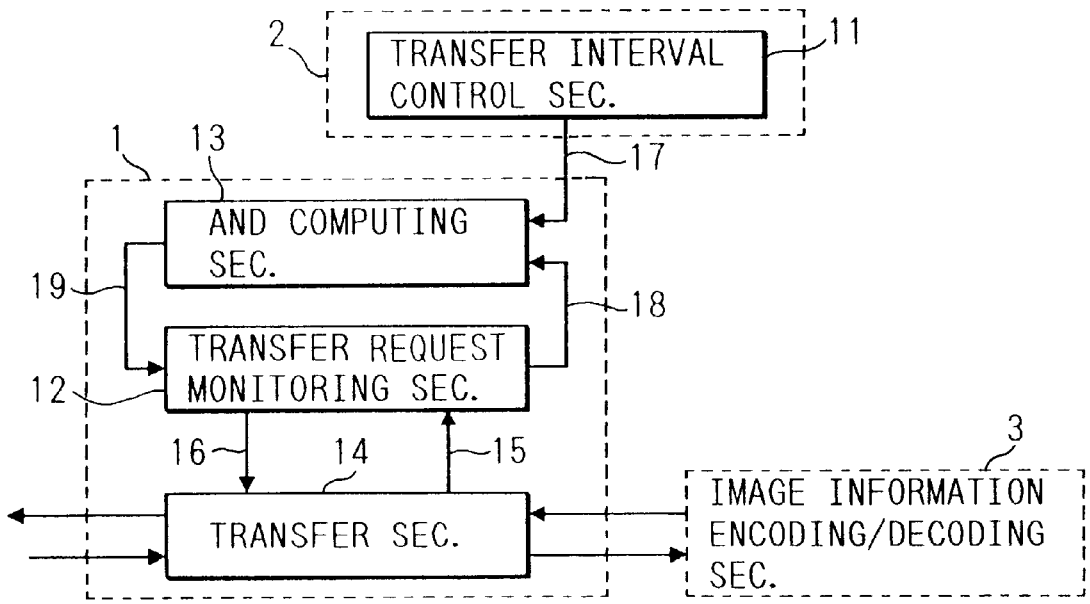
FIG. 2 is a block diagram illustrating an example of a configuration of an information transfer section 1 and a transfer control section 2.

A description will be given of an example of a transfer controlling method using the DMAC as the information transfer section 1. FIG. 2 is a block diagram illustrating an example of the configuration of the information transfer section 1 and the transfer control section 2. In the drawing, reference numeral 11 denotes a transfer-interval control section; 12, a transfer-request monitoring section; 13, an AND computing section; 14, a transfer section; 15, a transfer request signal; 16, a transfer permission signal; 17, an interval control signal; 18, a request signal; and 19, a computed result.

The transfer-interval control section 11 monitors a set time T1 of the transfer interval, and updates the interval control signal 17 after the lapse of the set time T1. A transfer time required for the operation of other devices can be set as the transfer interval. After the lapse of this transfer interval, the transfer of encoded information and decoded information is possible. The transfer-request monitoring section 12 monitors the transfer request signal 15 from the transfer section 14, and if there is a transfer request from the transfer section 14, the request signal is sent to the AND computing section 13. Also, the transfer-request monitoring section 12 receives the computed result 19 from the AND computing section 13, and if transfer is possible, the transfer permission signal 16 is sent to the transfer section 14. The AND computing section 13 computes an AND of the interval control signal 17 outputted from the transfer-interval control section 11 and the request signal 18 outputted from the transfer-request monitoring section 12. Then, the AND computing section 13 returns the computed result 19 to the transfer-request monitoring section 12. By virtue of the computation of this AND, only the time of the set time T1 of the transfer interval elapses, so that the state becomes a transferrable state, and it is possible to detect that a transfer request has been made. In other words, even if a transfer request is made, the transfer is prohibited until the set time T1 of the transfer interval elapses. In addition, even if the set time T1 of the transfer interval elapses, the transfer is, of course, not carried out unless a transfer request is made. If the transfer section 14 receives a request for transferring encoded information or image information outputted from the image-information encoding/decoding section 3, or receives a request for transferring the image information or encoded information inputted from an external device, when preparations such as the securing a memory area of the destination of transfer are made, the transfer section 14 outputs the transfer request signal 15 to the transfer-request monitoring section 12. Then, the transfer section 15 starts transfer upon receiving the transfer permission signal 16 from the transfer-request monitoring section 12.

Figure 3:
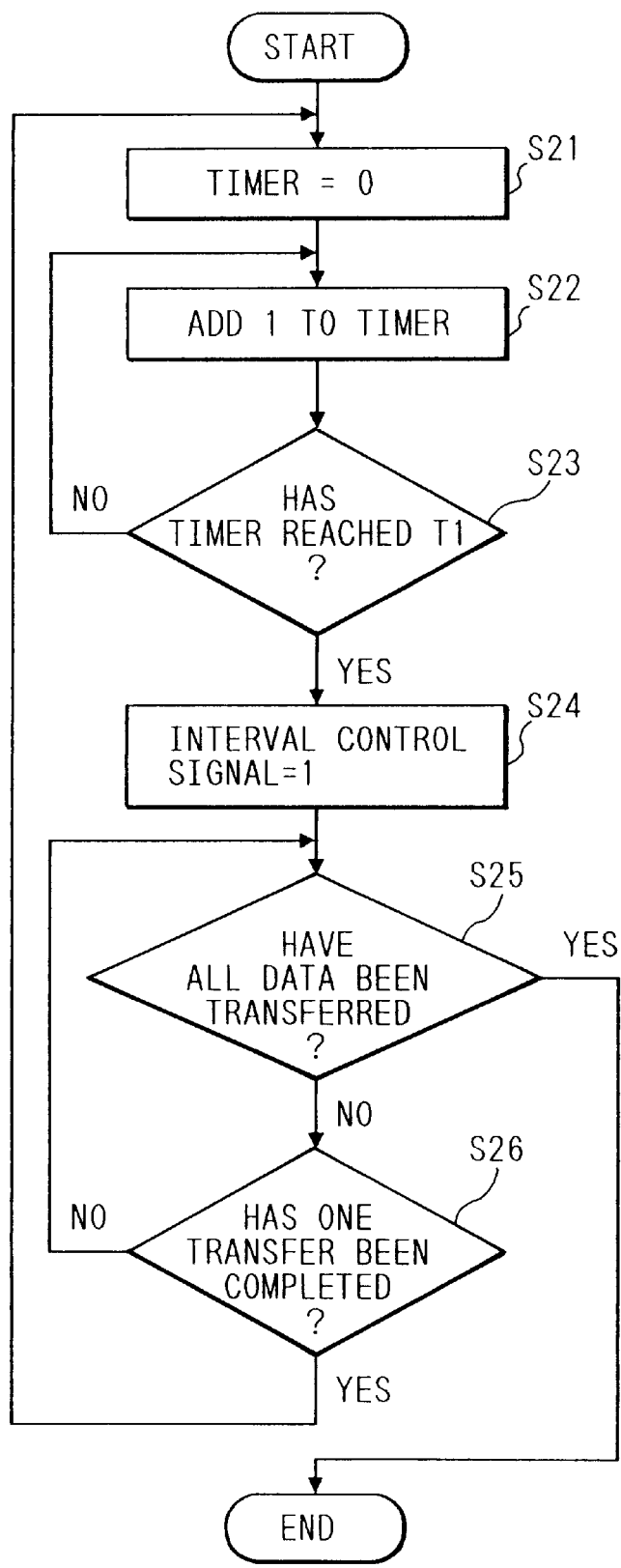
FIG. 3 is a flowchart illustrating an example of the operation of a transfer-interval control section 11.

FIG. 3 is a flowchart illustrating an example of the operation of the transfer-interval control section 11. First, in S21, a variable timer for measuring the transfer interval is set to 0. Next, in S22, 1 is added to the value of the variable timer after the lapse of a certain time interval. Then, in S23, a comparison is made between the transfer interval of the variable timer and the set time T1, and if the value of the variable timer has not reached the set time T1, it means that the time of a predetermined transfer interval has not elapsed, so that the operation returns to S22. In S23, if the value of the variable timer has reached the set time T1, it indicates that the time of the transfer interval has elapsed, so that, in S24, the interval control signal 17 is set to a "1," thereby indicating that transfer is possible. Subsequently, as the request signal 18 is set to a "1," the result of transfer permission is transmitted from the AND computing section 13 to the transfer-request monitoring section 12 as the computed result 9, and the transfer permission signal 16 is sent to the transfer section 14, whereupon transfer by the transfer section 14 is started. Incidentally, when the transfer by the transfer section 14 is completed, the interval control signal 17 is reset to a "0."

Even after the value of the variable timer has reached the set time T1, the transfer-interval control section 11 is set on standby until one transfer by the transfer section 14 is completed. When the data transmission is completed, the transfer section 14 informs the transfer-interval control section 11 to that effect. Also, when the transfer of all the data is completed, the transfer section 14 informs the transfer-interval control section 11 to that effect. In S25, a determination is made as to whether or not the transfer of all the data has been completed, and if the transfer of all the data has been completed, the processing by the transfer-interval control section 11 ends. If the transfer of all the data has not been completed in S25, a determination is made in S26 as to whether or not the transfer of data to be transferred during one transfer has been completed. If it has not been completed, the operation returns to S25 to wait for the completion of transfer. If the transfer of data to be transferred during one transfer has been completed, the operation returns to S21, and the timing of the transfer interval up until an ensuing transfer is performed again.

Figure 4:
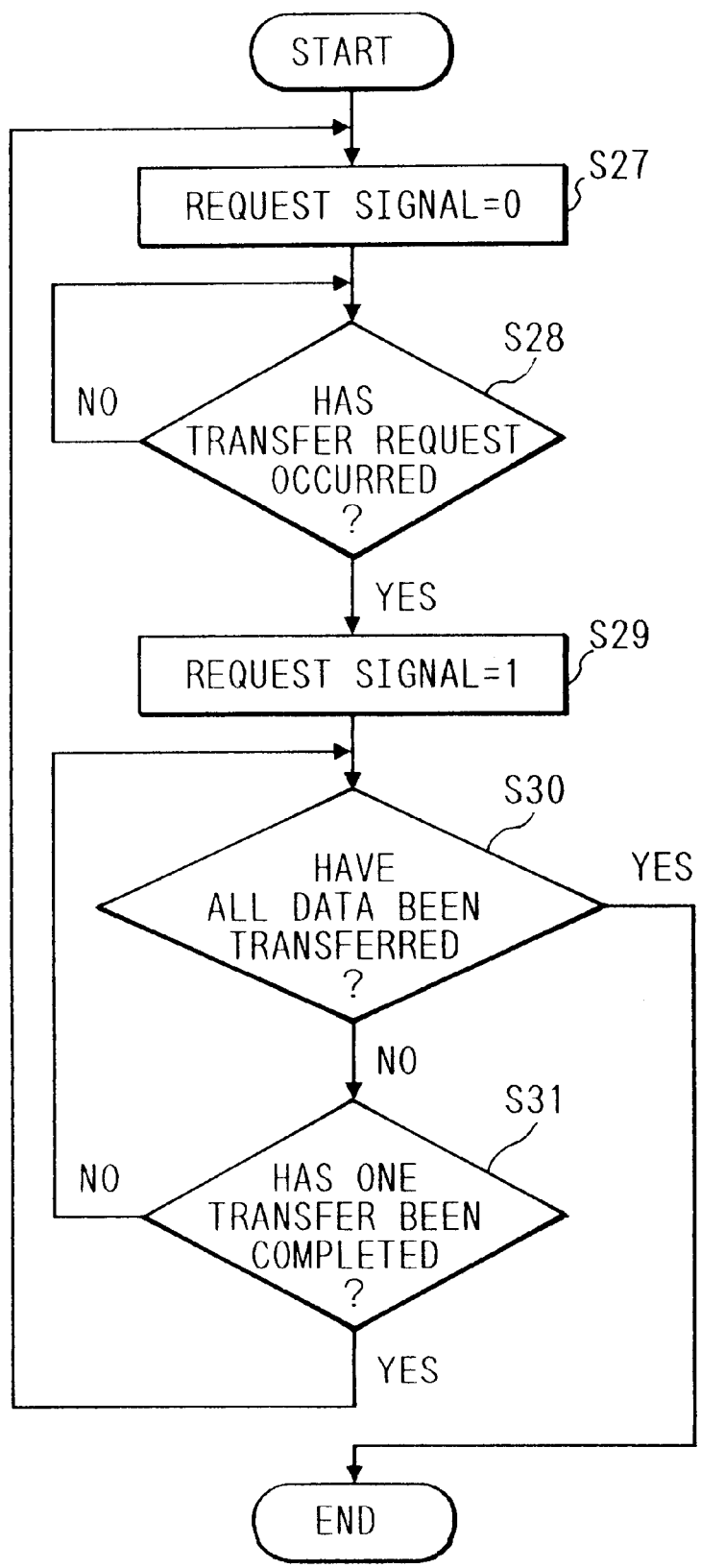
FIG. 4 is a flowchart illustrating an example of the operation of a transfer-request monitoring section 12.

FIG. 4 is a flowchart illustrating an example of the operation of the transfer-request monitoring section 12. First, in S27, the request signal 18 is set to a "0." Then, in S28, the operation waits until the transfer request signal 15 is inputted from the transfer section 14. If the transfer request signal 15 is inputted in S28, the request signal 18 is set to a "1" in S29. When the request signal 18 is set to a "1,"

and a "1" is outputted from the transfer-interval control section 11 as the interval control signal 17, a "1" is outputted from the AND computing section 13 as the computed result 19, thereby permitting transfer. Upon receipt of this signal, the transfer-request monitoring section 12 outputs the transfer permission signal 16, and thereby informs the transfer section 14 that transfer is possible. Incidentally, when the transfer by the transfer section 14 is completed, the request signal 18 is reset to a "0."

After the transfer request signal 15 is inputted, the transfer-request monitoring section 12 is also set on standby until one transfer by the transfer section 14 is completed. When the transfer of data to be transferred during one transfer is completed, the transfer section 14 informs the transfer-request monitoring section 12 to that effect. Also, when the transfer of all the data is completed, the transfer section 14 informs the transfer-request monitoring section 12 to that effect. In S30, a determination is made as to whether or not the transfer of all the data has been completed, and if the transfer of all the data has been completed, the processing by the transfer-request monitoring section 12 ends. If it is determined in S30 that the transfer of all the data has not been completed, a determination is made in S31 as to whether or not the transfer of data to be transferred during one transfer has been completed. If the data has not been fully transferred, the operation returns to S30 to wait for the completion of transfer. If the transfer of the data to be transferred during one transfer has been completed, the operation returns to S27 to monitor an ensuing transfer request.

Through the above-described control, the transfer from the information transfer section 1 is invariably effected at an interval of not less than the set time T1 in terms of the transfer interval, with the result that it is possible to restrict the transfer interval occupied by the image-information encoding/decoding processing apparatus on the data bus. At this time, T1=A/T, where the rate of transfer per unit time which can be occupied by the image-information encoding/ decoding processing apparatus is T (byte/sec), and the unit of transfer by the DMA is A (byte). That is, since the a maximum transfer amount per unit time on the data bus is fixed, if the an average transfer amount per unit time which is required by the other devices is determined by the system configuration of devices, on the basis of that transfer rate it is possible to set a transfer amount T per unit time which can be occupied by the image-information encoding/decoding processing apparatus. Then, if a transfer unit A at which the image-information encoding/decoding processing apparatus transfers during one transfer is set, the set time T1 of the transfer interval can be determined. The set time T1 of the transfer interval can be set in accordance with the system configuration of the devices since an arbitrary value can be set as the set time T1. In addition, it is possible to cope easily with a case where the system configuration is changed.

Here, the set value of the code-amount control section 4 can be set on the basis of the transfer unit A at which the image-information encoding/decoding processing apparatus transfers data during one transfer. Also, if the set time T1 of the transfer interval and the transfer amount T per unit time are determined, an average amount of data which can be transferred during one transfer can be determined. The set value of the code-amount control section 4 can also be determined on the basis of this amount of data. As the code amount is thus set in correspondence with the transfer rate, the control of the code amount, in which the transfer rate is also taken into consideration, becomes possible, so that the transfer of encoded information can be effected efficiently.

If the aforementioned transfer unit A is an excessively large value, the time required in one transfer becomes long, and the time occupied by the data bus becomes long, so that even if the transfer amount T per unit time is small, there are cases where transfer involved in other processing is hampered. To overcome such a drawback, an optimum transfer unit A can be set in the transfer control section 2 or the information transfer section 1. At this time, an arrangement can be provided such that the transfer unit A is set in correspondence with units of processing by the image-information encoding/decoding section 3, or the transfer unit A is dynamically set and the set time T1 of the transfer interval is set in correspondence with the amount of data of the encoded information.

As is apparent from the above description, in accordance with the present invention, an advantages is offered in that encoding processing and decoding processing can be effected by ensuring a minimum compression ratio by variable-length coding which uses code-amount control, while restricting a transfer amount per unit time which is occupied on the transmission path shared with other devices.

What is claimed is:

1. An image information encoding and decoding apparatus in which image input/output means, high-speed storage means, encoding and decoding means, and storage means for storing encoding image data that has been encoded by the encoding and decoding means are connected to a common data bus, comprising:

information transfer means for performing transfer of encoded or decoded data produced by said encoding and decoding means with said data bus:

transfer control means for allocating, to said information transfer means, a remaining frequency band excluding a frequency band necessary for said data bus to transfer image data from said high-speed storage means to said image input/output means;

code amount control means for determining an encoding ratio of said encoding and decoding means based on information relating to the remaining frequency band sent from the transfer control means so that said image input/output means can output, without interruption and without buffering, image data stored in said high-speed storage; and said encoding and decoding means for encoding image data at the encoding ratio determined by said code amount control means.

* * * * *